US009381776B2

(12) United States Patent
Hayashi

(10) Patent No.: US 9,381,776 B2
(45) Date of Patent: Jul. 5, 2016

(54) PNEUMATIC TIRE

(75) Inventor: Satoshi Hayashi, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 14/237,735

(22) PCT Filed: Aug. 9, 2012

(86) PCT No.: PCT/JP2012/070298
§ 371 (c)(1),
(2), (4) Date: Feb. 7, 2014

(87) PCT Pub. No.: WO2013/022054
PCT Pub. Date: Feb. 14, 2013

(65) Prior Publication Data
US 2014/0190610 A1 Jul. 10, 2014

(30) Foreign Application Priority Data

Aug. 10, 2011 (JP) .................. 2011-174454

(51) Int. Cl.
*B60C 13/02* (2006.01)
*B60C 17/00* (2006.01)

(52) U.S. Cl.
CPC .............. *B60C 13/02* (2013.01); *B60C 17/0009* (2013.04)

(58) Field of Classification Search
CPC ........ B60C 11/01; B60C 13/00; B60C 13/02; B60C 13/001; B60C 13/002; B60C 13/003; B60C 13/023; B60C 2013/026; B60C 13/04
USPC ............................................... 152/523–525
See application file for complete search history.

(56) References Cited

U.S. PATENT DOCUMENTS

| 5,263,525 A * | 11/1993 | Yamashita ............... 152/523 |
| 5,373,884 A * | 12/1994 | Kamegawa ............... B60C 3/04 152/454 |
| 5,411,068 A * | 5/1995 | Kogure ............... B60C 9/09 152/209.18 |
| 2009/0032161 A1 | 2/2009 | Yamaguchi |

(Continued)

FOREIGN PATENT DOCUMENTS

| CN | 201380726 Y * | 1/2010 |
| EP | 2 305 491 A1 | 4/2011 |

(Continued)

OTHER PUBLICATIONS

Machine Translation: JP2002-205514A; Teramoto, Kazuo; (No Date).*

(Continued)

*Primary Examiner* — Michael H Wilson
*Assistant Examiner* — Kendra Ly
(74) *Attorney, Agent, or Firm* — Birch, Stewart, Kolasch & Birch, LLP

(57) ABSTRACT

A tire having a large number of circular dimples 62 on sidewalls thereof is disclosed. Each dimple 62 has a slope surface 66 and a bottom surface 68. The dimple 62 has a small projection 70. The small projection 70 is annular and is formed on the slope surface 66. A cross-sectional shape of the small projection 70 is substantially a rectangle. The small projection 70 is arranged so as to be concentric with the contour of the dimple 62. The surface area of the slope surface 66 having the small projection 70 is larger than the surface area of the slope surface when it is postulated that the small projection 70 does not exist thereon.

9 Claims, 10 Drawing Sheets

(56) References Cited

U.S. PATENT DOCUMENTS

2011/0036475 A1* 2/2011 Kojima et al. ............... 152/454
2012/0060994 A1 3/2012 Hayashi et al.

FOREIGN PATENT DOCUMENTS

| | | | | |
|---|---|---|---|---|
| JP | 11-321243 A | | 11/1999 | |
| JP | 2000-16030 A | | 1/2000 | |
| JP | 2000016030 A | * | 1/2000 | ............ B60C 13/00 |
| JP | 2002205514 A | * | 7/2002 | ............ B60C 11/01 |
| JP | 2008-222006 A | | 9/2008 | |
| JP | 2010-95150 A | | 4/2010 | |
| JP | 2010-143420 A | | 7/2010 | |
| JP | 2010-274886 A | | 12/2010 | |
| JP | 2012131254 A | * | 7/2012 | |
| KR | 1020060123159 A | * | 4/2008 | |
| WO | 2007/032405 A1 | | 3/2007 | |

OTHER PUBLICATIONS

Machine Translation: JP 2000016030 A; Kunugi, Takeshi; no date.*
Machine Translation: KR1020060123159A; Kim Jeong-Nam; no date.*
Machine Translation:JP 2012131254 A; Kamikoro, Akira; no date.*
Machine Translation: CN 201380726 Y; Zhengjiang Li; no date.*
International Search Report for PCT/JP2012/070298 dated Nov. 13, 2012.

* cited by examiner

PNEUMATIC TIRE

TECHNICAL FIELD

The present invention relates to pneumatic tires. Specifically, the present invention relates to tires having dimples on side surfaces thereof.

BACKGROUND ART

In recent years, run flat tires including load support layers inside sidewalls have been developed and widespread. Highly hard crosslinked rubber is used for the support layers. Such run flat tires are called a side reinforcing type. In this type of a run flat tire, if the internal pressure is reduced due to puncture, a load is supported by the support layers. The support layers suppress flexure of the tire in a punctured state. Even if running is continued in the punctured state, the highly hard crosslinked rubber suppresses heat generation in the support layers. This run flat tire allows for running for some distance even in the punctured state. An automobile having such run flat tires mounted thereon need not be always equipped with a spare tire. The use of this run flat tire avoids change of a tire in an inconvenient place.

When running with the run flat tire in a punctured state is continued, deformation and restoration of the support layers are repeated. Due to the repetition, heat is generated in the support layers, and the temperature of the tire becomes high. The heat causes breakage of rubber components of the tire and separation among the rubber components of the tire. It is impossible to run with the tire in which the breakage and the separation have occurred. Run flat tires are desired which allow for running for a long period of time in a punctured state. In other words, run flat tires are desired in which breakage and separation due to heat are less likely to occur.

WO2007/032405 discloses a run flat tire having a large number of fins on sidewalls thereof. The surface area of the tire having the fins is large. The large surface area promotes release of heat from the tire to the atmosphere. In the tire, the temperature is less likely to rise.

JP2009-298397 discloses a run flat tire having a large number of dimples on sidewalls thereof. In the tire, turbulent flow is generated by the dimples. The turbulent flow promotes release of heat from the tire to the atmosphere. In the tire, the temperature is less likely to rise.

CITATION LIST

Patent Literature

Patent Literature 1: WO2007/032405
Patent Literature 2: JP2009-298397

SUMMARY OF THE INVENTION

Problems to be Solved by the Invention

Even for run flat tires having fins or dimples, further improvement of durability during running in a punctured state is desired. Similarly to run flat tires, for general pneumatic tires, improvement of durability is also desired.

An object of the present invention is to provide a pneumatic tire which is excellent in durability.

Solution to the Problems

A pneumatic tire according to the present invention includes, on side surfaces thereof, a large number of dimples and a land which is a part other than the dimples. Each dimple or the land has a small projection.

Each dimple can have a slope surface connected to the land and a bottom surface connected to the slope surface. Preferably, the small projection is formed on the slope surface. The small projection may be formed on the bottom surface.

Typically, a contour of each dimple is a circle. Preferably, the small projection is annular. The small projection is arranged so as to-be concentric with the contour of each dimple.

Preferably, a height of the small projection is equal to or greater than 0.25 mm but equal to or less than 1.0 mm, and a width of the small projection is equal to or greater than 0.25 mm but equal to or less than 1.0 mm.

Advantageous Effects of the Invention

In the pneumatic tire according to the present invention, turbulent flow is generated at each dimple. The turbulent flow collides against the small projection. The surface area of the small projection is larger than the surface area of a flat surface. In the tire, the surface area of a portion against which turbulent flow collides is large. The tire is excellent in heat release performance. The tire is excellent in durability.

DESCRIPTION OF EMBODIMENTS

The following will describe in detail the present invention based on preferred embodiments with appropriate reference to the drawings.

Figure 1:
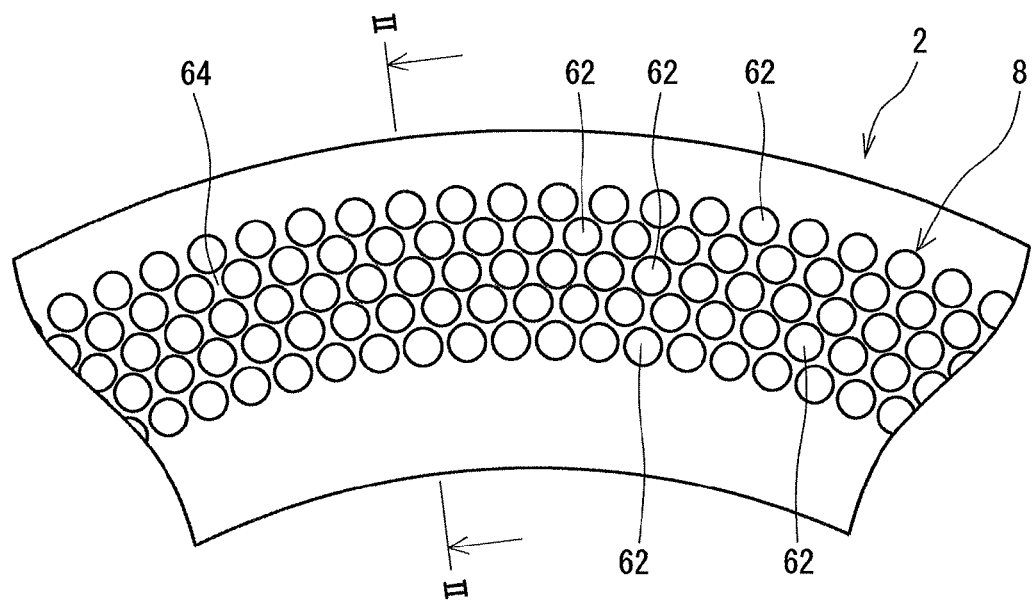
FIG. 1 is a front view showing a portion of a pneumatic tire according to one embodiment of the present invention.
Figure 2:
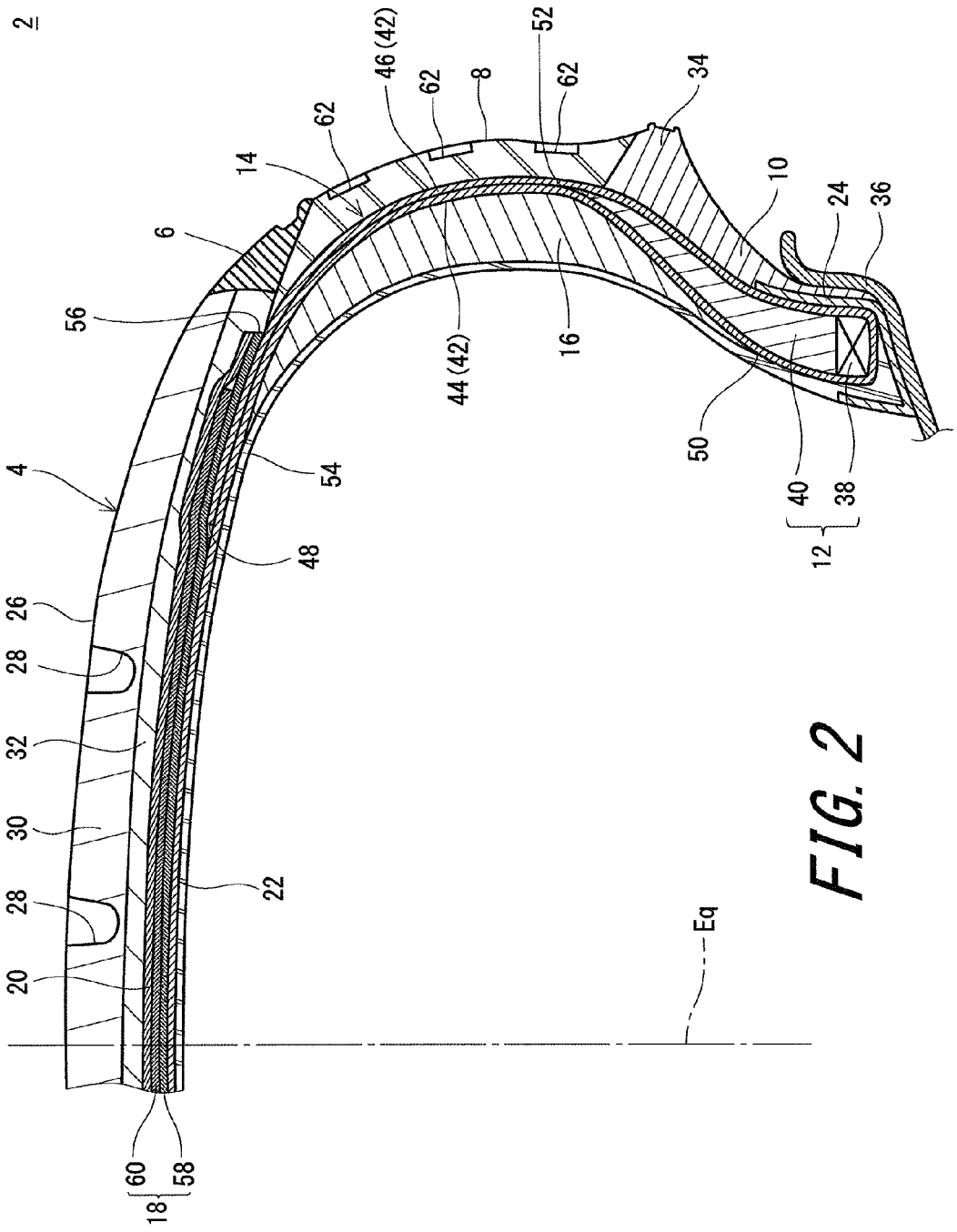
FIG. 2 is an enlarged cross-sectional view of the tire in FIG. 1, taken along a line II-II.

FIGS. 1 and 2 show a run flat tire 2. In FIG. 2, the up-down direction is the radial direction of the tire 2, the right-left direction is the axial direction of the tire 2, and the direction perpendicular to the surface of the sheet is the circumferential direction of the tire 2. In FIG. 2, an alternate long and short dash line Eq represents the equator plane of the tire 2.

The tire 2 includes a tread 4, wings 6, sidewalls 8, clinch portions 10, beads 12, a carcass 14, load support layers 16, a belt 18, a band 20, an inner liner 22, and chaffers 24. The belt 18 and the band 20 form a reinforcing layer. The reinforcing layer may be composed of the belt 18 only. The reinforcing layer may be composed of the band 20 only.

The tread 4 has a shape projecting outward in the radial direction. The tread 4 forms a tread surface 26 which is brought into contact with a road surface. Grooves 28 are formed on the tread surface 26. A tread pattern is formed by the grooves 28. The tread 4 includes a cap layer 30 and a base layer 32. The cap layer 30 is formed from a crosslinked rubber. The base layer 32 is formed from another crosslinked rubber. The cap layer 30 is located outward of the base layer 32 in the radial direction. The cap layer 30 is laminated on the base layer 32.

The sidewalls 8 extend from the ends of the tread 4 substantially inward in the radial direction. The sidewalls 8 are formed from a crosslinked rubber. The sidewalls 8 prevent injury of the carcass 14. The sidewalls 8 include ribs 34. The ribs 34 project outward in the axial direction. During running in a punctured state, the ribs 34 abut against flanges 36 of a rim. The abutment allows deformation of the beads 12 to be suppressed. The tire 2 in which the deformation is suppressed is excellent in durability in a punctured state.

The thermal conductivity of each sidewall 8 is preferably equal to or greater than 0.1 W/m/K. During running in a punctured state, heat is sufficiently released from the sidewall 8. In light of heat release, the thermal conductivity is more preferably equal to or greater than 0.2 W/m/K. By dispersing fibers having an excellent thermally conductive property in the rubber of the sidewall 8, a high thermal conductivity can be achieved.

The clinch portions 10 are located substantially inward of the sidewalls 8 in the radial direction. The clinch portions 10 are located outward of the beads 12 and the carcass 14 in the axial direction. The clinch portions 10 abut against the flanges 36 of the rim.

The beads 12 are located inward of the sidewalls 8 in the radial direction. Each bead 12 includes a core 38 and an apex 40 extending from the core 38 outward in the radial direction. The core 38 has a ring shape and includes a non-stretchable wound wire (typically, a steel wire). The apex 40 is tapered outward in the radial direction. The apex 40 is formed from a highly hard crosslinked rubber.

The carcass 14 is formed of a carcass ply 42. The carcass ply 42 extends on and between the beads 12 on both sides, and extends along the tread 4 and the sidewalls 8. The carcass ply 42 is turned up around each core 38 from the inner side to the outer side in the axial direction. Due to this turning-up, a main portion 44 and turned-up portions 46 are formed in the carcass ply 42. Ends 48 of the turned-up portions 46 are located immediately below the belt 18. In other words, each turned-up portion 46 overlaps the belt 18. The carcass 14 has a so-called "ultra-highly turned-up structure". The carcass 14 having the ultra-highly turned-up structure contributes to durability of the tire 2 in a punctured state. The carcass 14 contributes to durability in a punctured state.

The carcass ply 42 includes a large number of cords aligned with each other, and a topping rubber, which are not shown. The absolute value of the angle of each cord relative to the equator plane is 45° to 90° and more preferably 75° to 90°. In other words, the carcass 14 has a radial structure. The cords are formed from an organic fiber. Examples of preferable organic fibers include polyester fibers, nylon fibers, rayon fibers, polyethylene naphthalate fibers, and aramid fibers.

The load support layers 16 are located inward of the sidewalls 8 in the axial direction. Each support layer 16 is interposed between the carcass 14 and the inner liner 22. The support layers 16 are tapered inward and outward in the radial direction. Each support layer 16 has a crescent-like shape. The support layers 16 are formed from a highly hard crosslinked rubber. When the tire 2 is punctured, the support layers 16 support a load. The support layers 16 allow for running for some distance with the tire 2 even in a punctured state. The run flat tire 2 is of a side reinforcing type. The tire 2 may include support layers each having a shape different from the shape of the support layer 16 shown in FIG. 2.

Portions of the carcass 14 which overlap the support layers 16 are separated from the inner liner 22. In other words, the carcass 14 is bent due to the presence of the support layers 16. In a punctured state, a compressive load is applied to the support layers 16, and a tensile load is applied to regions of the carcass 14 which are near the support layers 16. Each support layer 16 is a lump of rubber and can sufficiently bear the compressive load. The cords of the carcass 14 can sufficiently bear the tensile load. The support layers 16 and the carcass cords suppress vertical flexure of the tire 2 in the punctured state. The tire 2 of which vertical flexure is suppressed is excellent in handling stability in a punctured state.

In light of suppression of vertical distortion in a punctured state, the hardness of each support layer 16 is preferably equal to or greater than 60 and more preferably equal to or greater than 65. In light of ride comfort in a normal state, the hardness is preferably equal to or less than 90 and more preferably equal to or less than 80. The hardness is measured according to the standard of "JIS K6253" with a type A durometer. The hardness is measured by pressing the durometer against the cross section shown in FIG. 2. The measurement is performed at a temperature of 23° C.

Lower ends 50 of the support layers 16 are located inward of upper ends 52 of the apexes 40 (i.e., outer ends, in the radial direction, of the beads) in the radial direction. In other words, the support layers 16 overlap the apexes 40. The distance in the radial direction between the lower end 50 of each support layer 16 and the upper end 52 of the corresponding apex 40 is preferably equal to or greater than 5 mm and preferably equal to or less than 50 mm. In the tire 2 in which the distance is within this range, a uniform stiffness distribution is obtained. The distance is more preferably equal to or greater than 10 mm. The distance is more preferably equal to or less than 40 mm.

Upper ends 54 of the support layers 16 are located inward of ends 56 of the belt 18 in the axial direction. In other words, the support layers 16 overlap the belt 18. The distance in the axial direction between the upper end 54 of each support layer 16 and the corresponding end 56 of the belt 18 is preferably equal to or greater than 2 mm and preferably equal to or less than 50 mm. In the tire 2 in which the distance is within this range, a uniform stiffness distribution is obtained. The distance is more preferably equal to or greater than 5 mm. The distance is more preferably equal to or less than 40 mm.

In light of suppression of vertical distortion in a punctured state, the maximum thickness of each support layer 16 is preferably equal to or greater than 3 mm, more preferably equal to or greater than 4 mm, and particularly preferably equal to or greater than 7 mm. In light of reduction in the weight of the tire 2, the maximum thickness is preferably equal to or less than 25 mm and more preferably equal to or less than 20 mm.

The thermal conductivity of each support layer 16 is preferably equal to or greater than 0.2 W/m/K. During running in a punctured state, heat is conducted from each support layer 16 to another component. In light of conduction, the thermal conductivity is more preferably equal to or greater than 0.3 W/m/K. By dispersing fibers having an excellent thermally conductive property in the rubber of each support layer 16, a high thermal conductivity can be achieved.

The belt 18 is located outward of the carcass 14 in the radial direction. The belt 18 is laminated on the carcass 14. The belt 18 reinforces the carcass 14. The belt 18 includes an inner layer 58 and an outer layer 60. As is obvious from FIG. 1, the width of the inner layer 58 is slightly greater than the width of the outer layer 60. Each of the inner layer 58 and the outer layer 60 includes a large number of cords aligned with each other, and a topping rubber, which are not shown. Each cord is tilted relative to the equator plane. Normally, the absolute value of the tilt angle is equal to or greater than 10° but equal to or less than 35°. The direction in which each cord of the inner layer 58 is tilted relative to the equator plane is opposite to the direction in which each cord of the outer layer 60 is tilted relative to the equator plane. The material of the cords is preferably steel. An organic fiber may be used for the cords. The belt 18 may include three or more layers.

The band 20 covers the belt 18. The band 20 includes a cord and a topping rubber, which are not shown. The cord is helically wound. The band 20 has a so-called jointless structure. The cord extends substantially in the circumferential direction. The angle of the cord relative to the circumferential direction is equal to or less than 5° and further equal to or less than 2°. The belt 18 is secured by the cord, so that lifting of the belt 18 is suppressed. The cord is formed from an organic fiber. Examples of preferable organic fibers include nylon fibers, polyester fibers, rayon fibers, polyethylene naphthalate fibers, and aramid fibers.

The tire 2 may include, instead of the band 20, so-called edge bands which cover only the vicinities of the ends 56 of the belt 18. The tire 2 may include both the band 20 and the edge bands.

The inner liner 22 is bonded to the inner peripheral surface of the carcass 14. The inner liner 22 is formed from a crosslinked rubber. A rubber that has an excellent air blocking property is used for the inner liner 22. The inner liner 22 maintains the internal pressure of the tire 2.

As shown in FIGS. 1 and 2, the tire 2 has a large number of dimples 62 on the side surfaces thereof. In the present invention, the side surfaces mean regions of the outer surfaces of the tire 2 that can be viewed in the axial direction. Typically, the dimples 62 are formed on the surfaces of the sidewalls 8. Of each side surface, a part other than the dimples 62 is a land 64.

Figure 3A:
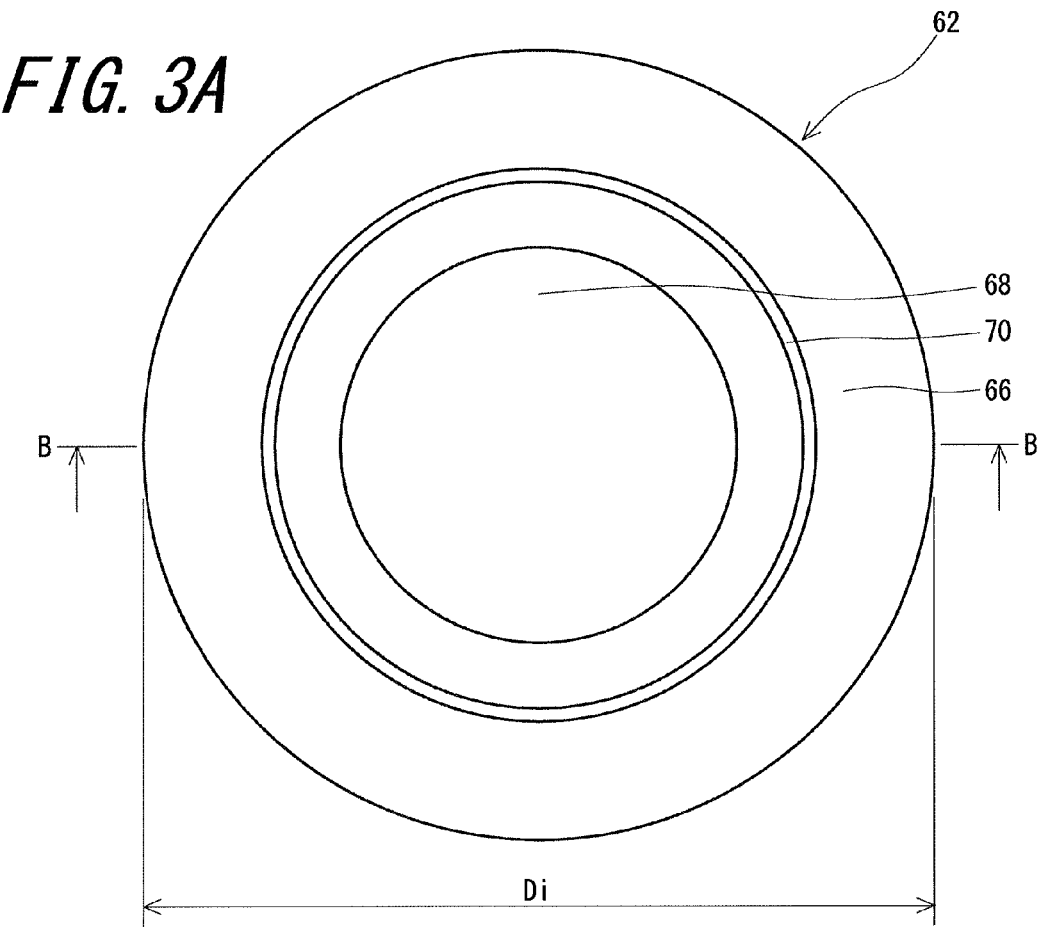
FIG. 3A is an enlarged plan view showing a dimple of the tire in FIG. 2.
Figure 3B:
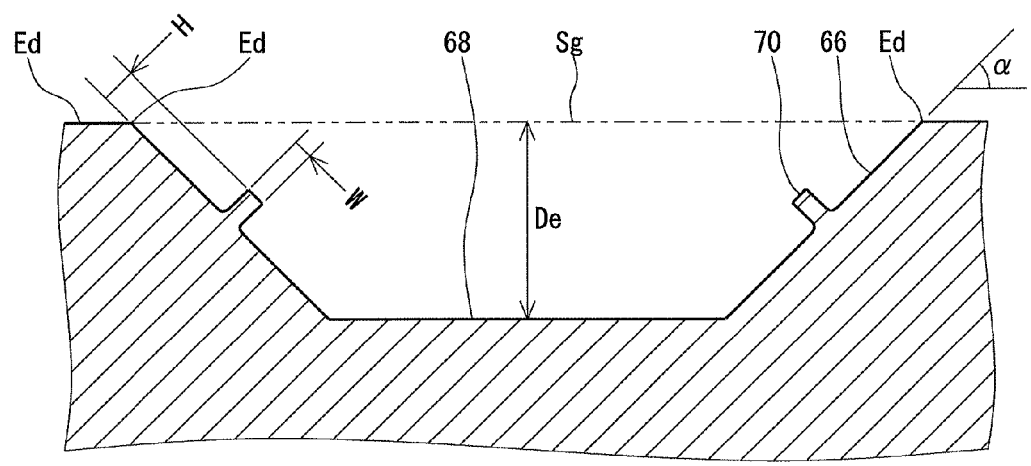
FIG. 3B is a cross-sectional view taken along a line B-B in FIG. 3A.

FIG. 3A is an enlarged plan view showing the dimple 62 of the tire 2 in FIG. 2, and FIG. 3B is a cross-sectional view taken along a line B-B in FIG. 3A. The contour of the dimple 62 is a circle. The dimple 62 has a slope surface 66 and a bottom surface 68. The slope surface 66 is connected to the land 64. The slope surface 66 is annular. The slope surface 66 is tilted relative to the land 64. The contour of the slope surface 66 is a circle. The width of the slope surface 66 is uniform. Therefore, the circle that is the contour of the bottom surface 68 is concentric with the circle that is the contour of the dimple 62.

The dimple 62 has a small projection 70. The small projection 70 is formed on the slope surface 66. As is obvious from FIG. 3A, the small projection 70 is annular. As is obvious from FIG. 3B, a cross-sectional shape of the small projection 70 is substantially a rectangle. The small projection 70 is arranged so as to be concentric with the contour of the dimple 62. The surface area of the slope surface 66 having the small projection 70 is larger than the slope surface of the slope surface when it is postulated that the small projection 70 does not exist thereon.

The tire 2 rotates during running. A vehicle on which the tire 2 is mounted travels. By the rotation of the tire 2 and the travelling of the vehicle, air flows across the dimples 62. At the upstream side of the edge of each dimple 62, turbulent flow is generated. The turbulent flow collides against the bottom surface 68 and collides against the downstream side of the slope surface 66. As described above, the slope surface 66 has the small projection 70. The turbulent flow also collides against the small projection 70. In the tire 2, the surface area of a portion against which the turbulent flow collides is large. In the tire 2, heat release is promoted. In the tire 2, breakage of rubber components and separation among rubber components which are caused due to heat are suppressed. The tire 2 allows for running for a long period of time in a punctured state. The turbulent flow contributes to heat release not only in a punctured state but also in a normal state. The dimples 62 also contribute to durability of the tire 2 in a normal state. Running in a state where the internal pressure is less than a normal value may be caused by inadvertence of a driver. The dimples 62 can also contribute to durability in this case.

In the tire 2, temperature rise is suppressed by the dimples 62. Thus, even when the support layers 16 are thin, running in a punctured state for a long period of time is possible. The thin support layers 16 achieve reduction in the weight of the tire 2. The thin support layers 16 reduce rolling resistance. The tire 2 which is lightweight and has reduced rolling resistance contributes to reduction in the fuel consumption of a vehicle. Furthermore, the thin support layers 16 also achieve excellent ride comfort.

In FIG. 3, an arrow H indicates the height of the projection. In light of achievement of a large surface area, the height H is preferably equal to or greater than 0.25 mm and particularly preferably equal to or greater than 0.50 mm. In light of stiffness of the projection, the height H is preferably equal to or less than 1.0 mm and particularly preferably equal to or less than 0.8 mm.

In FIG. 3, an arrow W indicates the width of the projection. In light of stiffness of the projection, the width W is preferably equal to or greater than 0.25 mm and particularly preferably equal to or greater than 0.50 mm. In light of reduction in temperature, the width W is preferably equal to or less than 1.0 mm and particularly preferably equal to or less than 0.8 mm.

In FIG. 3, an alternate long and two short dashes line Sg is a line segment extending from one edge Ed of the dimple 62 to another edge Ed of the dimple 62. In FIG. 3, an arrow Di indicates the length of the line segment Sg, that is, the diameter of the dimple 62. The diameter Di is preferably equal to or greater than 2 mm and preferably equal to or less than 70 mm. Air sufficiently flows into the dimple 62 having a diameter Di of 2 mm or greater, and thus turbulent flow is sufficiently generated. The dimple 62 suppresses temperature rise of the tire 2. In this respect, the diameter Di is more preferably equal to or greater than 4 mm and particularly preferably equal to or greater than 6 mm. In the tire 2 having the dimples 62 having a diameter Di of 70 mm or less, turbulent flow can be generated at a large number of locations. Furthermore, in the tire 2 having the dimples 62 having a diameter Di of 70 mm or less, the surface area of each side surface is large. The large surface area promotes release of heat from the tire 2. The dimples 62 suppress temperature rise of the tire 2. In this respect, the diameter Di is more preferably equal to or less than 40 mm and particularly preferably equal to or less than 20 mm.

The tire 2 may have two or more types of dimples 62 having diameters Di different from each other. In the tire 2 having the two or more types of the dimples 62, the average diameter of the dimples 62 is preferably 2 mm, more preferably equal to or greater than 4 mm, and particularly preferably equal to or greater than 6 mm. The average diameter is preferably equal to or less than 70 mm, more preferably equal to or less than 40 mm, and particularly preferably equal to or less than 20 mm. The ratio of the number of the dimples 62 whose diameters Di are within the above range, relative to the total number of the dimples 62, is preferably equal to or greater than 50% and more preferably equal to or greater than 70%. The ratio is ideally 100%.

In FIG. 3, an arrow De indicates the depth of the dimple 62. The depth De is the distance between the deepest portion of the dimple 62 and the line segment Sg. The depth De is preferably equal to or greater than 0.5 mm and preferably equal to or less than 7 mm. At the dimple 62 having a depth De of 0.5 mm or greater, sufficient turbulent flow is generated. In this respect, the depth De is more preferably equal to or greater than 0.8 mm and particularly preferably equal to or greater than 1.0 mm. In the dimple 62 having a depth De of 7 mm or less, air is less likely to stay at its bottom. In this respect, the depth De is more preferably equal to or less than 4 mm and particularly preferably equal to or less than 3.0 mm.

The tire 2 may have two or more types of dimples 62 having depths De different from each other. In the tire 2 having the two or more types of the dimples 62, the average depth of the dimples 62 is preferably equal to or greater than 0.5 mm, more preferably equal to or greater than 0.8 mm, and particularly preferably equal to or greater than 1.0 mm. The average depth is preferably equal to or less than 7 mm, more preferably equal to or less than 4 mm, and particularly preferably equal to or less than 3.0 mm. The ratio of the number of the dimples 62 whose depths De are within the above range, relative to the total number of the dimples 62, is preferably equal to or greater than 50% and more preferably equal to or greater than 70%. The ratio is ideally 100%.

The ratio (De/Di) of the depth De to the diameter Di is preferably equal to or greater than 0.01 and preferably equal to or less than 0.5. At the dimple 62 having a ratio (De/Di) of 0.01 or greater, sufficient turbulent flow is generated. In this respect, the ratio (De/Di) is more preferably equal to or greater than 0.03 and particularly preferably equal to or greater than 0.05. In the dimple 62 having a ratio (De/Di) of 0.5 or less, air is less likely to stay at its bottom. In this respect, the ratio (De/Di) is more preferably equal to or less than 0.4 and particularly preferably equal to or less than 0.3.

The volume of the dimple 62 is preferably equal to or greater than 1.0 mm$^3$ and preferably equal to or less than 400 mm$^3$. At the dimple 62 having a volume of 1.0 mm$^3$ or greater, sufficient turbulent flow is generated. In this respect, the volume is more preferably equal to or greater than 1.5 mm$^3$ and particularly preferably equal to or greater than 2.0 mm$^3$. In the dimple 62 having a volume of 400 mm$^3$ or less, air is less likely to stay at its bottom. In this respect, the volume is more preferably equal to or less than 300 mm$^3$ and particularly preferably equal to or less than 250 mm$^3$.

The sum of the volumes of all the dimples 62 is preferably equal to or greater than 300 mm$^3$ and preferably equal to or less than 5000000 mm$^3$. In the tire 2 in which the sum is equal to or greater than 300 mm$^3$, heat is sufficiently released. In this respect, the sum is more preferably equal to or greater than 600 mm$^3$ and particularly preferably equal to or greater than 800 mm$^3$. The tire 2 in which the sum is equal to or less than 5000000 mm$^3$ is lightweight. In this respect, the sum is more preferably equal to or less than 1000000 mm$^3$ and particularly preferably equal to or less than 500000 mm$^3$.

The area of the dimple 62 is preferably equal to or greater than 3 mm$^2$ and preferably equal to or less than 4000 mm$^2$. At the dimple 62 having an area of 3 mm$^2$ or greater, sufficient turbulent flow is generated. In this respect, the area is more preferably equal to or greater than 12 mm$^2$ and particularly preferably equal to or greater than 20 mm$^2$. The tire 2 in which the area of each dimple 62 is equal to or less than 4000 mm$^2$ is lightweight. In this respect, the area is more preferably equal to or less than 2000 mm$^2$ and particularly preferably equal to or less than 1300 mm$^2$. In the present invention, the area of the dimple 62 means the area of a region surrounded by the contour of the dimple 62. In the case of a circular dimple 62, the area S is calculated by the following mathematical formula.

$$S = (Di/2)^2 * \pi$$

The width of the land 64 between the adjacent dimples 62 is preferably equal to or greater than 0.05 mm and preferably equal to or less than 20 mm. In the tire 2 in which the width is equal to or greater than 0.05 mm, the land 64 has sufficient wear resistance. In this respect, the width is more preferably equal to or greater than 0.10 mm and particularly preferably equal to or greater than 0.2 mm. In the tire 2 in which the width is equal to or less than 20 mm, turbulent flow can be generated at a large number of locations. In this respect, the width is more preferably equal to or less than 15 mm and particularly preferably equal to or less than 10 mm.

The number of the dimples 62 per one side surface is preferably equal to or greater than 50 and preferably equal to or less than 5000. In the tire 2 in which the number is equal to or greater than 50, turbulent flow can be generated at a large number of locations. In this respect, the number is more preferably equal to or greater than 100 and particularly preferably equal to or greater than 150. In the tire 2 in which the number is equal to or less than 5000, each dimple 62 can have a sufficient size. In this respect, the number is more preferably equal to or less than 2000 and particularly preferably equal to or less than 1000. The number and pattern of the dimples 62 can be determined as appropriate in accordance with the size of the tire 2 and the area of each side surface.

Since the tire 2 rotates, the flow direction of air relative to each dimple 62 is not uniform. Therefore, for the tire 2, dimples 62 having no directionality, namely, dimples 62 whose plane shapes are circles, are most preferred. In consideration of the rotating direction of the tire 2, dimples 62 having directionality may be arranged. In each dimple 62 having directionality, a small projection is preferably formed on a slope surface at the downstream side.

In the present invention, the "dimple" is clearly distinguishable from a groove seen in an existing tire 2. A groove has a large length relative to its width. In a tire 2 having a groove, air is likely to stay. Meanwhile, each dimple 62 has a low ratio of its long diameter to its short diameter. Therefore, in the tire 2 having the dimples 62, air is less likely to stay. The ratio of the long diameter to the short diameter is preferably equal to or less than 3.0, more preferably equal to or less than 2.0, and particularly preferably equal to or less than 1.5. In each circular dimple 62, the ratio is 1.0. The long diameter is the length of a longest line segment that can be drawn within the contour when the dimple 62 is viewed at infinity. The short diameter is the size of the dimple 62 in a direction orthogonal to the longest line segment.

As shown in FIG. 1, in the tire 2, the large number of dimples 62 are arranged in a staggered manner. Therefore, six dimples 62 are adjacent to one dimple 62. In the tire 2 having this arrangement, locations where turbulent flow is generated are uniformly distributed. In the tire 2, heat is uniformly released from each side surface. The arrangement is excellent in a cooling effect. The large number of dimples 62 may be arranged randomly.

As shown in FIG. 3, a cross-sectional shape of the dimple 62 is a trapezoid. In other words, the shape of the dimple 62 is a circular truncated cone. In the dimple 62, the volume is large with respect to the depth De. Therefore, both a sufficient volume and a small depth De can be achieved. When a small depth De is set, staying of air can be suppressed.

In FIG. 3, a reference sign α indicates an angle of the slope surface 66. The angle α is preferably equal to or greater than 10° and preferably equal to or less than 70°. In the dimple 62 having an angle α of 10° or greater, both a sufficient volume and a small depth De can be achieved. In this respect, the angle α is more preferably equal to or greater than 20° and particularly preferably equal to or greater than 25°. In the dimple 62 having an angle α of 70° or less, turbulent flow easily flows in to the bottom surface 68. In this respect, the angle is more preferably equal to or less than 60° and particularly preferably equal to or less than 55°.

The tire 2 may have non-circular dimples instead of the circular dimples 62 or together with the circular dimples 62. Plane shapes of typical non-circular dimples are polygons. The tire 2 may have dimples whose plane shapes are ellipses or elongated circles. The tire 2 may have dimples whose plane shapes are tear shapes (teardrop type). The tire 2 may have projections together with the dimples 62.

The dimensions and angles of each component of the tire are measured in a state where the tire is mounted on a normal rim and inflated to a normal internal pressure, unless otherwise specified. During the measurement, no load is applied to the tire. In the present specification, the normal rim means a rim specified in a standard on which the tire is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. It should be noted that in the case of a tire for passenger car, the dimensions and angles are measured in a state where the internal pressure is 180 kPa.

Figure 4A:
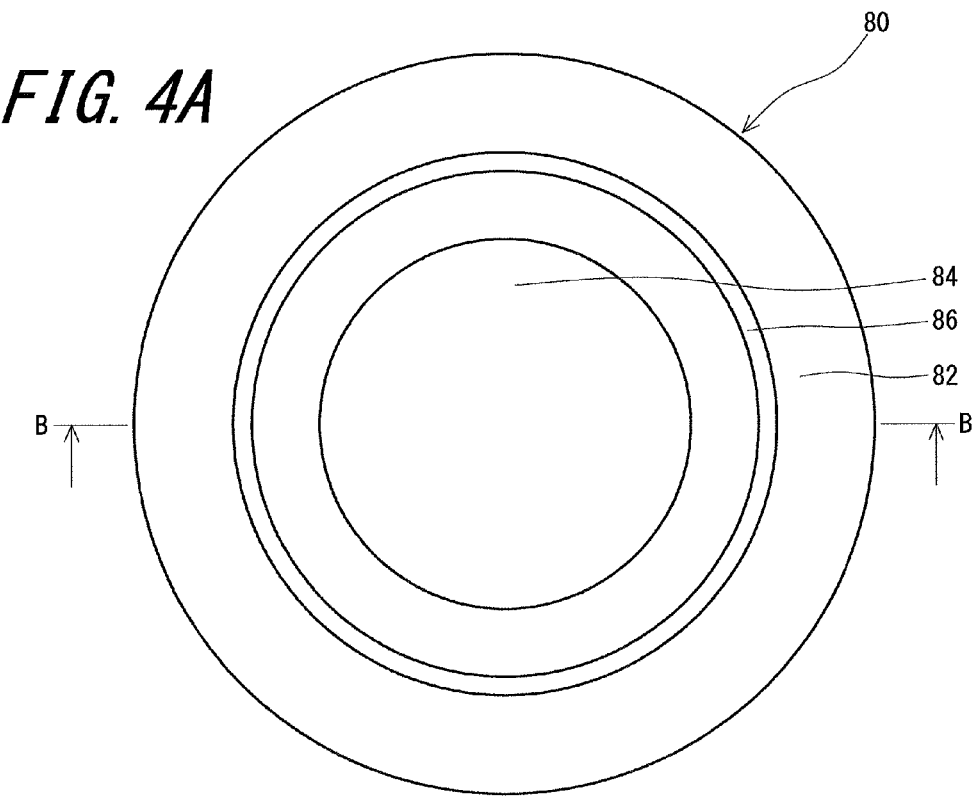
FIG. 4A is a plan view showing a dimple of a tire according to another embodiment of the present invention.
Figure 4B:
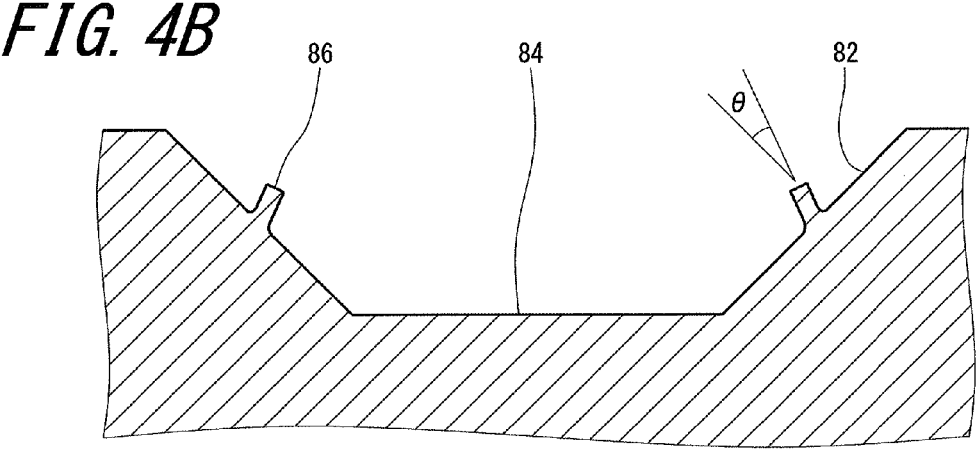
FIG. 4B is a cross-sectional view taken along a line B-B in FIG. 4A.

FIG. 4 shows a dimple 80 of a tire according to another embodiment of the present invention. The contour of the dimple 80 is a circle. The dimple 80 has a slope surface 82 and a bottom surface 84. The slope surface 82 has a small projection 86. The small projection 86 is annular. The longitudinal direction of the small projection 86 is tilted relative to the normal direction of the slope surface 82. In FIG. 4B, a reference sign θ indicates the angle of the longitudinal direction of the small projection 86 relative to the normal direction of the slope surface 82. The angle θ is preferably equal to or greater than −45° and preferably equal to or less than 45°, and is particularly preferably equal to or greater than −30° and particularly preferably equal to or less than 30°.

The height of the small projection 86 is also preferably equal to or greater than 0.25 mm and particularly preferably equal to or greater than 0.50 mm. The height is preferably equal to or less than 1.0 mm and particularly preferably equal to or less than 0.8 mm. The width of the small projection 86 is preferably equal to or greater than 0.25 mm and particularly preferably equal to or greater than 0.50 mm. The width is preferably equal to or less than 1.0 mm and particularly preferably equal to or less than 0.8 mm.

Figure 5A:
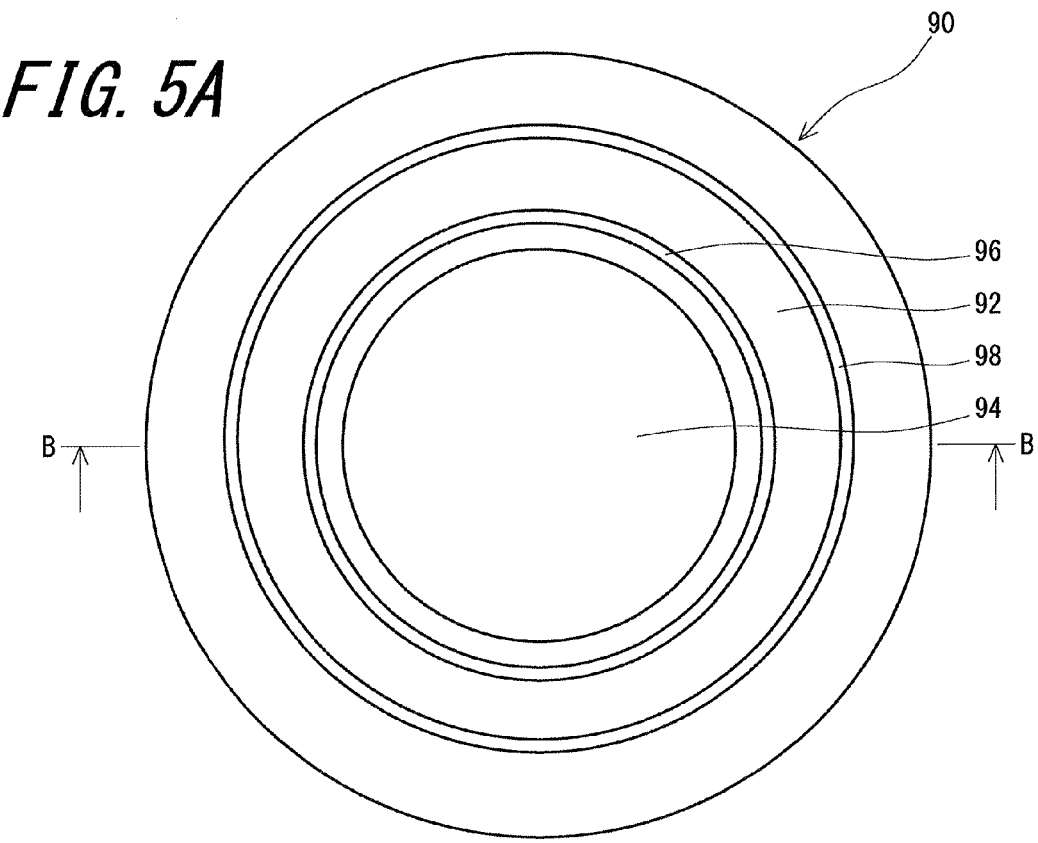
FIG. 5A is a plan view showing a dimple of a tire according to still another embodiment of the present invention.
Figure 5B:
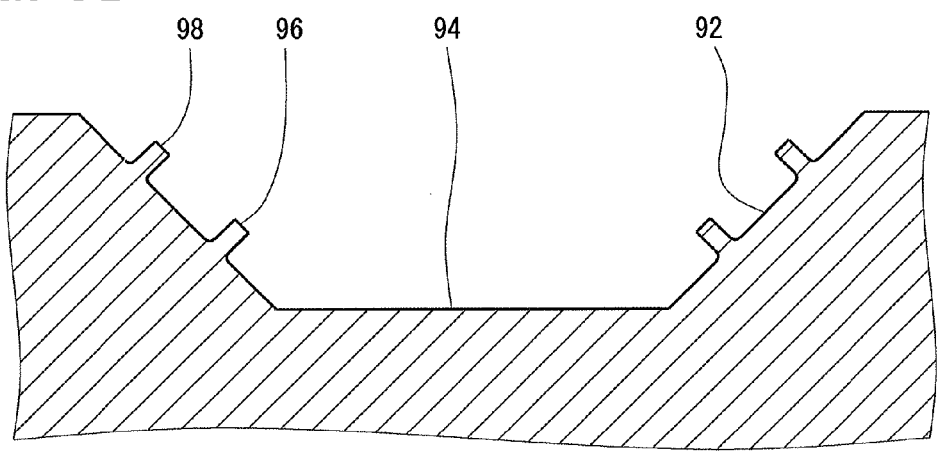
FIG. 5B is a cross-sectional view taken along a line B-B in FIG. 5A.

FIG. 5 shows a dimple 90 of a tire according to still another embodiment of the present invention. The contour of the dimple 90 is a circle. The dimple 90 has a slope surface 92 and a bottom surface 94. The slope surface 92 has a first small projection 96 and a second small projection 98. The first small projection 96 and the second small projection 98 are annular. The surface area of the slope surface 92 having the two small projections 86 is very large. The slope surface 92 promotes heat release.

The height of each of the first small projection 96 and the second small projection 98 is preferably equal to or greater than 0.25 mm and particularly preferably equal to or greater than 0.50 mm. The height is preferably equal to or less than 1.0 mm and particularly preferably equal to or less than 0.8 mm. The width of each of the first small projection 96 and the second small projection 98 is preferably equal to or greater than 0.25 mm and particularly preferably equal to or greater than 0.50 mm. The width is preferably equal to or less than 1.0 mm and particularly preferably equal to or less than 0.8 mm.

Figure 6A:
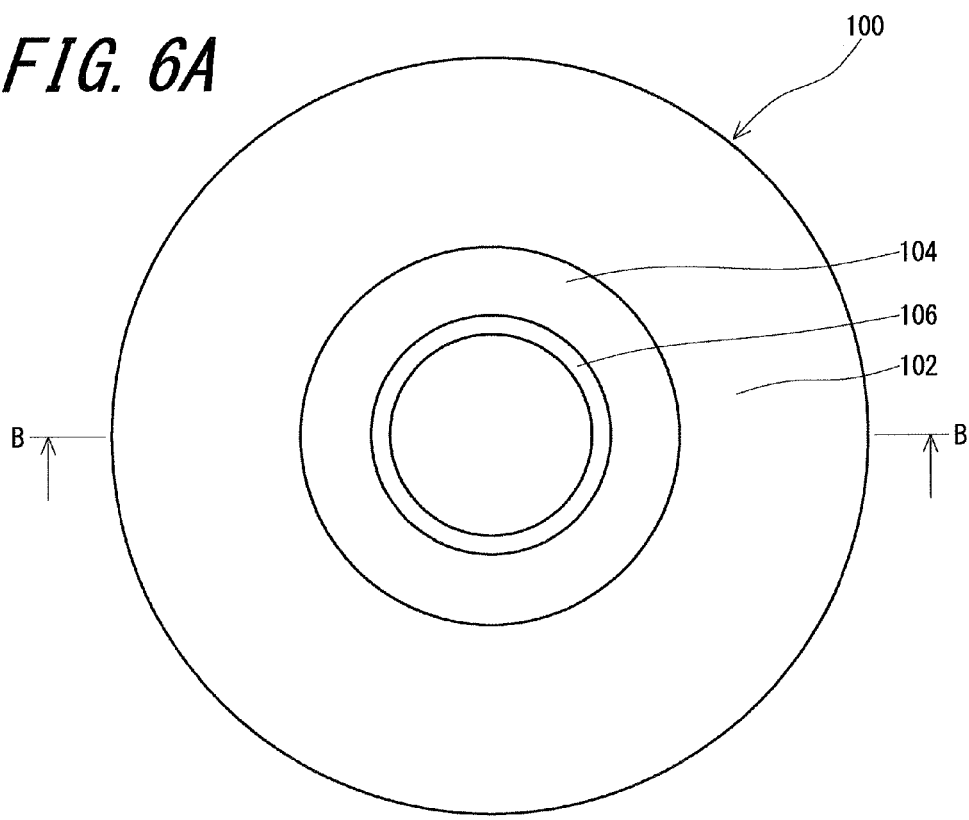
FIG. 6A is a plan view showing a dimple of a tire according to still another embodiment of the present invention.
Figure 6B:
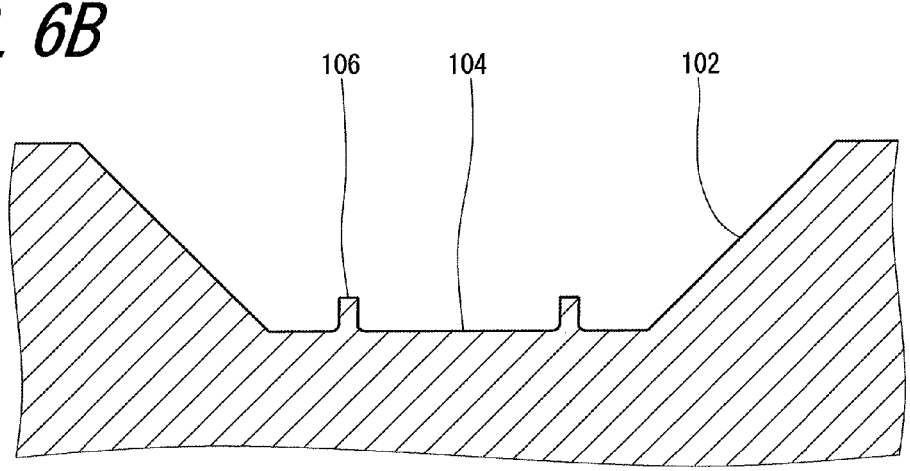
FIG. 6B is a cross-sectional view taken along a line B-B in FIG. 6A.

FIG. 6 shows a dimple 100 of a tire according to still another embodiment of the present invention. The contour of the dimple 100 is a circle. The dimple 100 has a slope surface 102 and a bottom surface 104. The bottom surface 104 has a small projection 106. The small projection 106 is annular. The surface area of the bottom surface 104 having the small projection 106 is large. The bottom surface 104 promotes heat release.

The height of the small projection 106 is also preferably equal to or greater than 0.25 mm and particularly preferably equal to or greater than 0.50 mm. The height is preferably equal to or less than 1.0 mm and particularly preferably equal to or less than 0.8 mm. The width of the small projection 106 is preferably equal to or greater than 0.25 mm and particularly preferably equal to or greater than 0.50 mm. The width is preferably equal to or less than 1.0 mm and particularly preferably equal to or less than 0.8 mm.

Figure 7A:
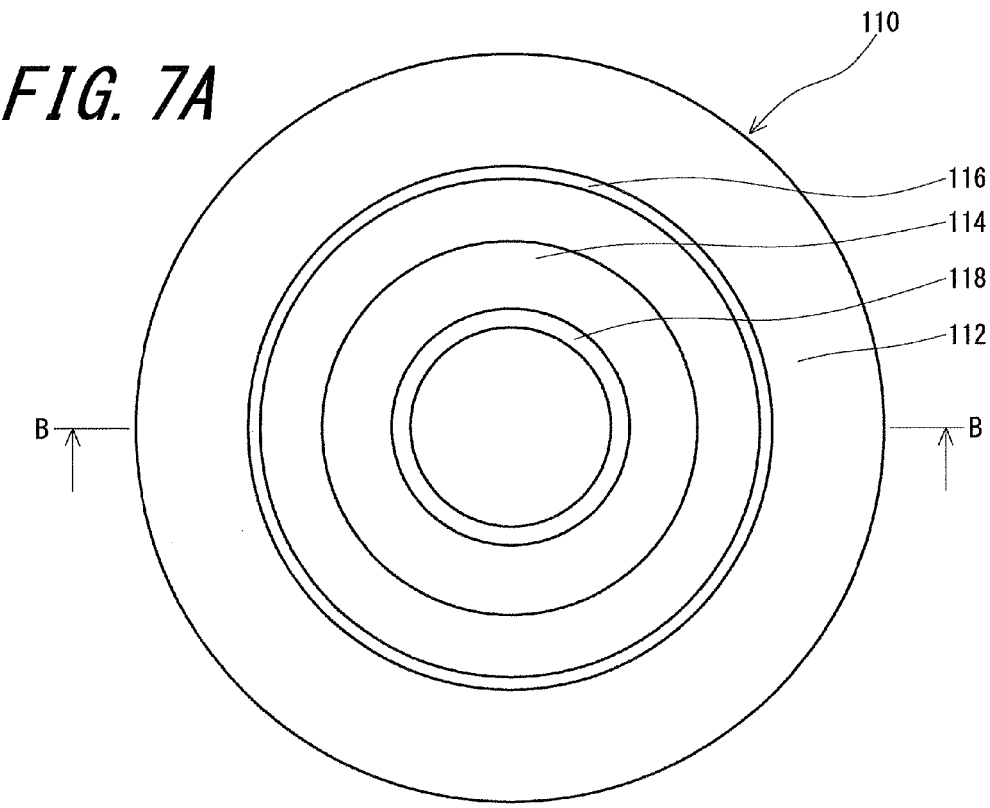
FIG. 7A is a plan view showing a dimple of a tire according to still another embodiment of the present invention.
Figure 7B:
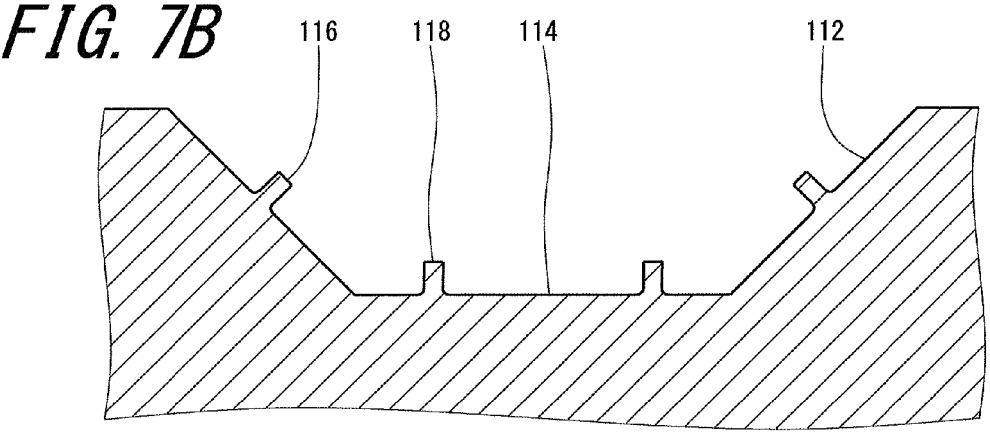
FIG. 7B is a cross-sectional view taken along a line B-B in FIG. 7A.

FIG. 7 shows a dimple 110 of a tire according to still another embodiment of the present invention. The contour of the dimple 110 is a circle. The dimple 110 has a slope surface 112 and a bottom surface 114. The slope surface 112 has a first small projection 116. The bottom surface 114 has a second small projection 118. The first small projection 116 and the second small projection 118 are annular. The surface area of the slope surface 112 having the first small projection 116 is large. The slope surface 112 promotes heat release. The surface area of the bottom surface 114 having the second small projection 118 is large. The bottom surface 114 promotes heat release.

The height of each of the first small projection 116 and the second small projection 118 is preferably equal to or greater than 0.25 mm and particularly preferably equal to or greater than 0.50 mm. The height is preferably equal to or less than 1.0 mm and particularly preferably equal to or less than 0.8 mm. The width of each of the first small projection 116 and the second small projection 118 is preferably equal to or greater than 0.25 mm and particularly preferably equal to or greater than 0.50 mm. The width is preferably equal to or less than 1.0 mm and particularly preferably equal to or less than 0.8 mm.

Figure 8A:
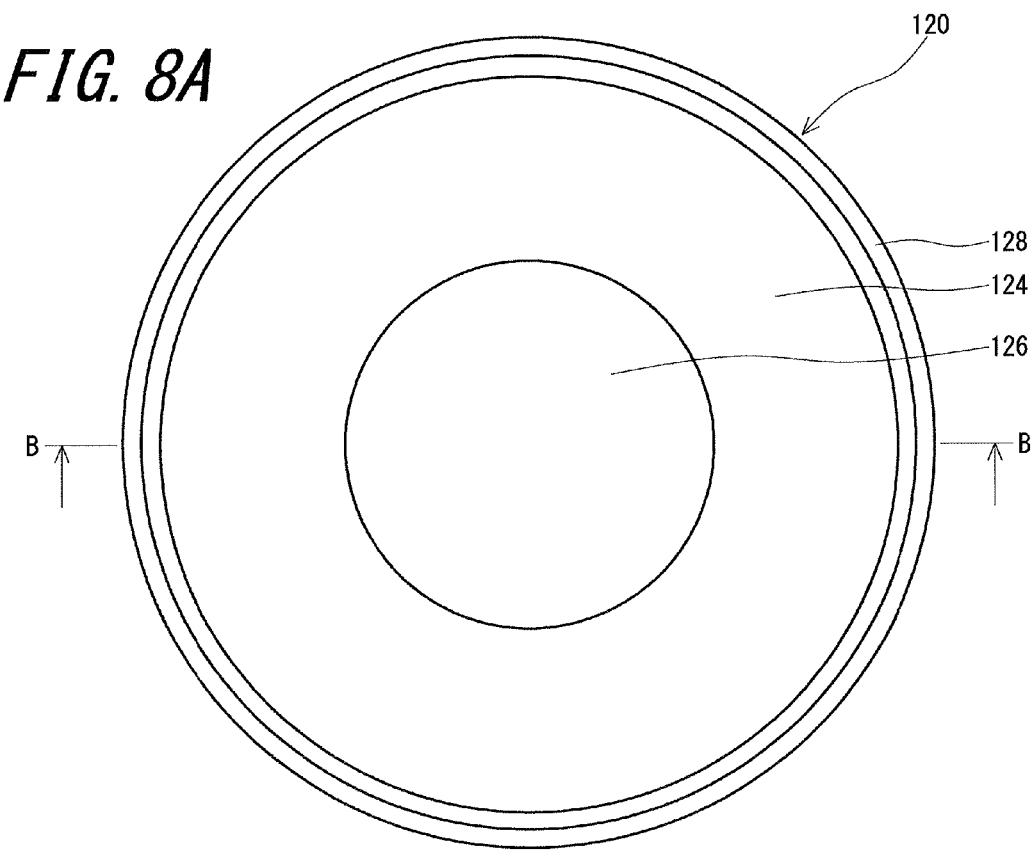
FIG. 8A is a plan view showing a dimple of a tire according to still another embodiment of the present invention.
Figure 8B:
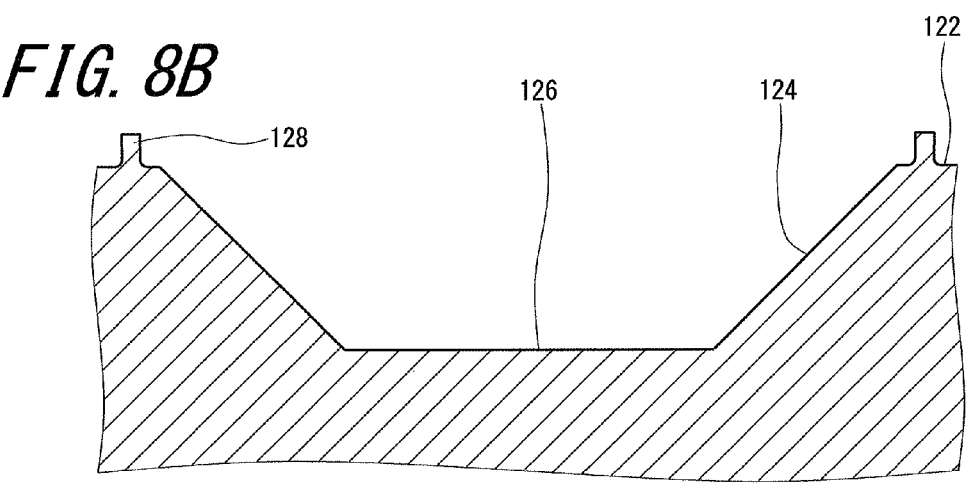
FIG. 8B is a cross-sectional view taken along a line B-B in FIG. 8A.

FIG. 8 shows a dimple 120 and a land 122 of a tire according to still another embodiment of the present invention. The contour of the dimple 120 is a circle. The dimple 120 has a slope surface 124 and a bottom surface 126. The land 122 has a small projection 128. The small projection 128 is annular. The surface area of the land 122 having the small projection 128 is large. Turbulent flow generated at the dimple 120 collides against the small projection 128. The land 122 promotes heat release.

The height of the small projection 128 is also preferably equal to or greater than 0.25 mm and particularly preferably equal to or greater than 0.50 mm. The height is preferably equal to or less than 1.0 mm and particularly preferably equal to or less than 0.8 mm. The width of the small projection 128 is preferably equal to or greater than 0.25 mm and particularly preferably equal to or greater than 0.50 mm. The width is preferably equal to or less than 1.0 mm and particularly preferably equal to or less than 0.8 mm.

Figure 9A:
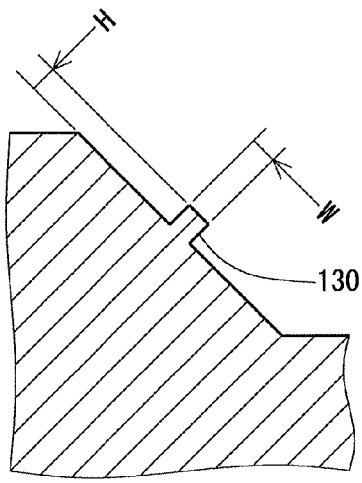
FIG. 9A is a cross-sectional view showing a dimple of a tire according to still another embodiment of the present invention.

FIG. 9A shows a small projection 130 whose cross-sectional shape is a square. Although not shown, the small projection 130 is annular similarly to the small projection 70 shown in FIG. 3. The small projection 130 promotes heat release. The height H of the small projection 130 is also preferably equal to or greater than 0.25 mm and particularly preferably equal to or greater than 0.50 mm. The height H is preferably equal to or less than 1.0 mm and particularly preferably equal to or less than 0.8 mm. The width W of the small projection 130 is preferably equal to or greater than 0.25 mm and particularly preferably equal to or greater than 0.50 mm. The width W is preferably equal to or less than 1.0 mm and particularly preferably equal to or less than 0.8 mm.

Figure 9B:
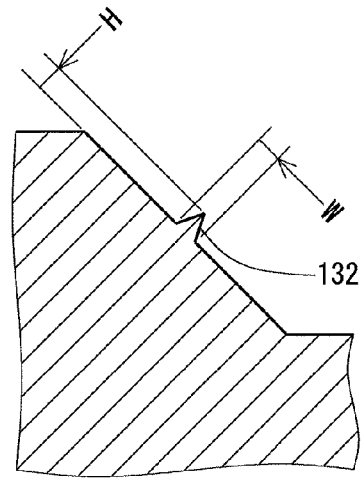
FIG. 9B is a cross-sectional view showing a dimple of a tire according to still another embodiment of the present invention.

FIG. 9B shows a small projection 132 whose cross-sectional shape is a triangle. Although not shown, the small projection 132 is annular similarly to the small projection 70 shown in FIG. 3. The small projection 132 promotes heat release. The height H of the small projection 132 is also preferably equal to or greater than 0.25 mm and particularly preferably equal to or greater than 0.50 mm. The height H is preferably equal to or less than 1.0 mm and particularly preferably equal to or less than 0.8 mm. The width W of the small projection 132 is preferably equal to or greater than 0.25 mm and particularly preferably equal to or greater than 0.50 mm. The width W is preferably equal to or less than 1.0 mm and particularly preferably equal to or less than 0.8 mm.

Figure 9C:
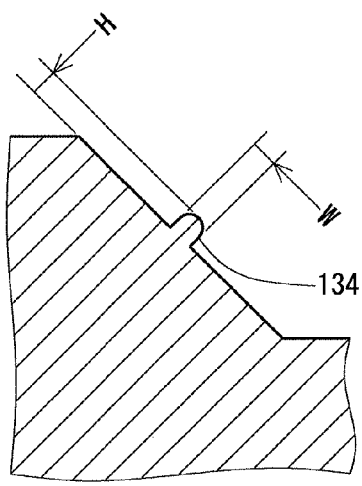
FIG. 9C is a cross-sectional view showing a dimple of a tire according to still another embodiment of the present invention.

FIG. 9C shows a small projection 134 having a cross-sectional shape whose end is semi-circular. Although not shown, the small projection 134 is annular similarly to the small projection 70 shown in FIG. 3. The small projection 134 promotes heat release. The height H of the small projection 134 is also preferably equal to or greater than 0.25 mm and particularly preferably equal to or greater than 0.50 mm. The height H is preferably equal to or less than 1.0 mm and particularly preferably equal to or less than 0.8 mm. The width W of the small projection 134 is preferably equal to or greater than 0.25 mm and particularly preferably equal to or greater than 0.50 mm. The width W is preferably equal to or less than 1.0 mm and particularly preferably equal to or less than 0.8 mm.

Figure 9D:
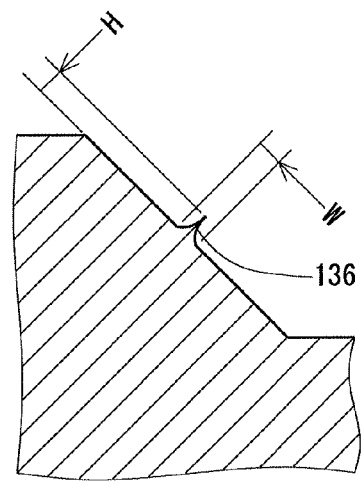
FIG. 9D is a cross-sectional view showing a dimple of a tire according to still another embodiment of the present invention.

FIG. 9D shows a small projection 136 having a cross-sectional shape whose surface is concave. Although not shown, the small projection 136 is annular similarly to the small projection 70 shown in FIG. 3. The small projection 136 promotes heat release. The height H of the small projection 136 is also preferably equal to or greater than 0.25 mm and particularly preferably equal to or greater than 0.50 mm. The height H is preferably equal to or less than 1.0 mm and particularly preferably equal to or less than 0.8 mm. The width W of the small projection 136 is preferably equal to or greater than 0.25 mm and particularly preferably equal to or greater than 0.50 mm. The width W is preferably equal to or less than 1.0 mm and particularly preferably equal to or less than 0.8 mm.

Figure 10A:
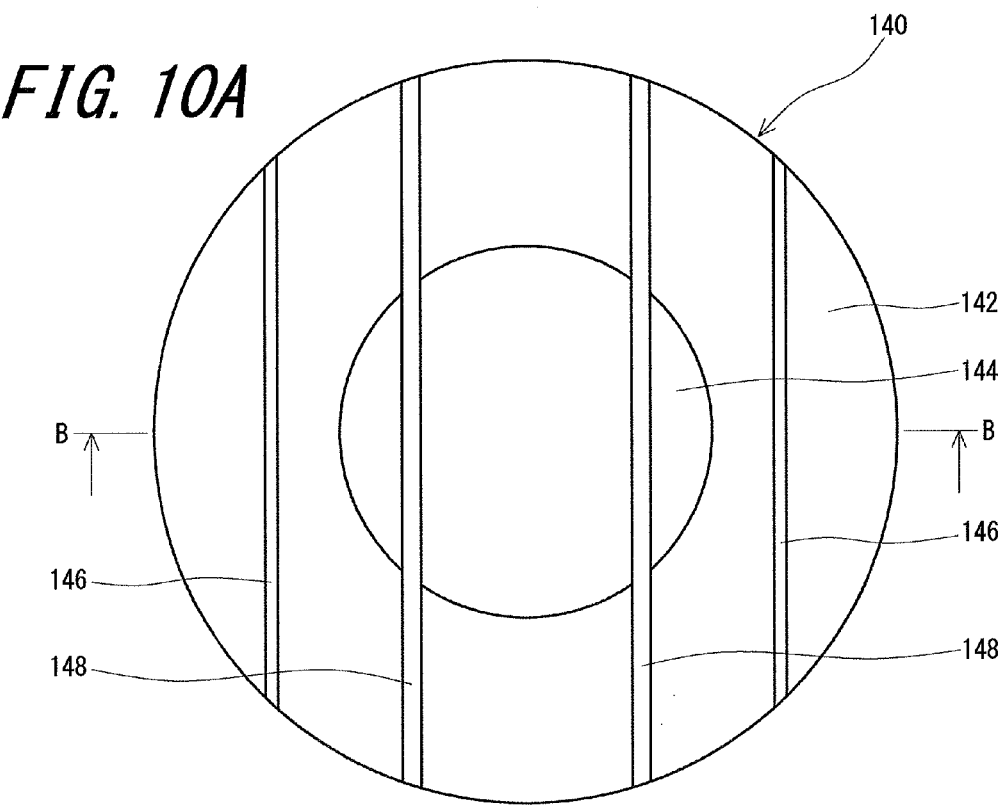
FIG. 10A is a plan view showing a dimple of a tire according to still another embodiment of the present invention.
Figure 10B:
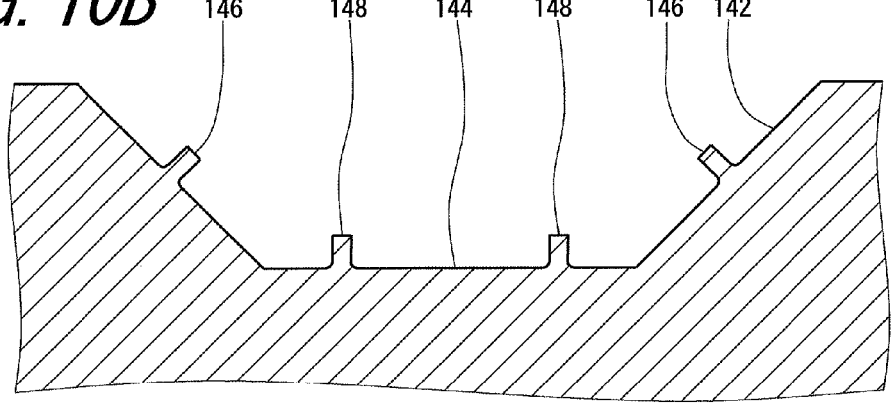
FIG. 10B is a cross-sectional view taken along a line B-B in FIG. 10A.

FIG. 10 shows a dimple 140 of a tire according to still another embodiment of the present invention. The contour of the dimple 140 is a circle. The dimple 140 has a slope surface 142 and a bottom surface 144. The dimple 140 has two first small projections 146 and two second small projections 148. Each first small projection 146 has a linear shape. Each first small projection 146 is formed on the slope surface 142. Each second small projection 148 has a linear shape. Each second small projection 148 is formed on the slope surface 142 and the bottom surface 144. Turbulent flow generated at the upstream-side edge of the dimple 140 collides against the first small projections 146 and the second small projections 148. The first small projections 146 and the second small projections 148 promote heat release.

The height of each of the first small projections 146 and the second small projections 148 is preferably equal to or greater than 0.25 mm and particularly preferably equal to or greater than 0.50 mm. The height is preferably equal to or less than 1.0 mm and particularly preferably equal to or less than 0.8 mm. The width of each of the first small projections 146 and the second small projections 148 is preferably equal to or greater than 0.25 mm and particularly preferably equal to or greater than 0.50 mm. The width is preferably equal to or less than 1.0 mm and particularly preferably equal to or less than 0.8 mm.

EXAMPLES

The following will show effects of the present invention by means of examples, but the present invention should not be construed in a limited manner based on the description of these examples.

Example 1

The run flat tire shown in FIGS. 1 to 3 was produced. The size of the tire was "235/55R18 100V". The tire has a large number of dimples. Each dimple has a slope surface and a bottom surface. An annular projection is formed on the slope surface. A cross-sectional shape of the projection is a rectangle. The height H of the projection is 0.50 mm, and the width W of the projection is 0.25 mm.

Examples 2 to 5

Tires of Examples 2 to 5 were obtained in the same manner as Example 1, except the angle θ of the projection was as shown in Table 1 below.

Examples 6 to 10

Tires of Examples 6 to 10 were obtained in the same manner as Example 1, except the height H and the width W of the projection were as shown in Table 2 below.

Examples 11 to 14

Tires of Examples 11 to 14 were obtained in the same manner as Example 1, except the cross-sectional shape of the projection was as shown in Table 3 below.

Examples 15 to 19

Tires of Examples 15 to 19 were obtained in the same manner as Example 1, except the positions and the number of the projections were as shown in Table 4 below.

Comparative Example

A tire of a comparative example was obtained in the same manner as Example 1, except no projection was provided.

[Temperature]

Each tire was mounted on a normal rim and inflated such that the internal pressure thereof became 220 kPa. A valve core of the tire was removed to cause the inside of the tire to communicate with the atmosphere. The tire was run on a drum at a speed of 80 km/h with a load of 5.1 kN applied to the tire. A surface temperature of the tire was measured when the running distance was 20 km. The results are shown in Tables 1 to 4 below.

TABLE 1

| | | \multicolumn{5}{c}{Results of Evaluation} | | | | |
|---|---|---|---|---|---|---|
| | | Example 2 | Example 3 | Example 1 | Example 4 | Example 5 |
| Number of annular small projections | Slope surface | 1 | 1 | 1 | 1 | 1 |
| | Bottom surface | 0 | 0 | 0 | 0 | 0 |
| | Land | 0 | 0 | 0 | 0 | 0 |
| Number of linear small projections | | 0 | 0 | 0 | 0 | 0 |
| Cross-sectional shape | | Rect. | Rect. | Rect. | Rect. | Rect. |
| Height H (mm) | | 0.50 | 0.50 | 0.50 | 0.50 | 0.50 |
| Width W (mm) | | 0.25 | 0.25 | 0.25 | 0.25 | 0.25 |
| θ (degree) | | −45 | −30 | 0 | 30 | 45 |
| Temperature (° C.) | | 81.7 | 81.6 | 81.2 | 81.5 | 81.6 |

TABLE 2

| | | Results of Evaluation | | | | |
|---|---|---|---|---|---|---|
| | | Example 6 | Example 7 | Example 8 | Example 9 | Example 10 |
| Number of annular small projections | Slope surface | 1 | 1 | 1 | 1 | 1 |
| | Bottom surface | 0 | 0 | 0 | 0 | 0 |
| | Land | 0 | 0 | 0 | 0 | 0 |
| Number of linear small projections | | 0 | 0 | 0 | 0 | 0 |
| Cross-sectional shape | | Rect. | Rect. | Rect. | Rect. | Rect. |
| Height H (mm) | | 0.15 | 0.25 | 1.0 | 0.50 | 0.50 |
| Width W (mm) | | 0.25 | 0.25 | 0.25 | 0.50 | 1.0 |
| θ (degree) | | 0 | 0 | 0 | 0 | 0 |
| Temperature (° C.) | | 81.9 | 81.7 | 80.5 | 81.0 | 81.2 |

TABLE 3

| | | Results of Evaluation | | | |
|---|---|---|---|---|---|
| | | Example 11 | Example 12 | Example 13 | Example 14 |
| Number of annular small projections | Slope surface | 1 | 1 | 1 | 1 |
| | Bottom surface | 0 | 0 | 0 | 0 |
| | Land | 0 | 0 | 0 | 0 |
| Number of linear small projections | | 0 | 0 | 0 | 0 |
| Cross-sectional shape | | FIG. 9A | FIG. 9B | FIG. 9C | FIG. 9D |
| Height H (mm) | | 0.50 | 0.50 | 0.50 | 0.50 |
| Width W (mm) | | 0.25 | 0.25 | 0.25 | 0.25 |
| θ (degree) | | 0 | 0 | 0 | 0 |
| Temperature (° C.) | | 81.2 | 81.4 | 81.0 | 81.4 |

TABLE 4

| | | Results of Evaluation | | | | | |
|---|---|---|---|---|---|---|---|
| | | Example 15 | Example 16 | Example 17 | Example 18 | Example 19 | Comparative Example |
| Positions of small projections | | FIG. 5 | FIG. 6 | FIG. 8 | FIG. 10 | FIG. 7 | — |
| Number of annular small projections | Slope surface | 2 | 0 | 0 | 0 | 1 | 0 |
| | Bottom surface | 0 | 1 | 0 | 0 | 1 | 0 |
| | Land | 0 | 0 | 1 | 0 | 0 | 0 |
| Number of linear small projections | | 0 | 0 | 0 | 4 | 0 | 0 |
| Cross-sectional shape | | Rect. | Rect. | Rect. | Rect. | Rect. | — |
| Height H (mm) | | 0.50 | 0.50 | 0.50 | 0.50 | 0.50 | — |
| Width W (mm) | | 0.25 | 0.25 | 0.25 | 0.25 | 0.25 | — |
| θ (degree) | | 0 | 0 | 0 | 0 | 0 | — |
| Temperature (° C.) | | 80.6 | 82.2 | 82.0 | 80.5 | 81.1 | 82.3 |

As shown in Tables 1 to 4, the surface temperature of the tire of each Example is lower than that of the tire of the comparative example. From the results of evaluation, advantages of the present invention are clear.

INDUSTRIAL APPLICABILITY

The pneumatic tire according to the present invention can be mounted on various vehicles.

DESCRIPTION OF THE REFERENCE CHARACTERS

2 ... tire
4 ... tread
8 ... sidewall
10 ... clinch portion
12 ... bead
14 ... carcass
16 ... support layer
18 ... belt
20 ... band
62, 80, 90, 100, 110, 120, 140 ... dimple
64, 122 ... land
66, 82, 92, 102, 112, 124, 142 ... slope surface
68, 84, 94, 104, 114, 126, 144 ... bottom surface
70, 86, 106, 128, 130, 132, 134, 136 ... projection
96, 116, 146 ... first small projection
98, 118, 148 ... second small projection

The invention claimed is:

1. A pneumatic tire comprising, on a sidewall surface thereof, a large number of dimples and a land portion separating the dimples, wherein
the land portion surface and the sidewall surface of the tire are substantially on the same plane,
each dimple has a sloped surface connected to the land portion surface and a bottom surface connected to the sloped surface, wherein the bottom surface includes the entire deepest portion of the dimple,
each dimple includes a small projection which is formed on the sloped surface and does not touch the bottom surface, or an annular small projection which is formed on the bottom surface and does not touch the sloped surface, and
each dimple has a ratio of a long diameter to a short diameter equal to or less than 3.0, wherein
a width of the small projection on the sloped surface is smaller than a width of the sloped surface,
the height of the small projection is equal to or greater than 0.25 mm but equal to or less than 1.0 mm, and
the width of the small projection is equal to or greater than 0.25 mm but equal to or less than 1.0 mm.

2. The pneumatic tire of claim 1, wherein the cross-sectional shape of the small projection is substantially a rectangle.

3. The pneumatic tire of claim 1, wherein
the height of the small projection is equal to or greater than 0.50 mm but equal to or less than 0.8 mm, and
the width of the small projection is equal to or greater than 0.50 mm but equal to or less than 0.8 mm.

4. The pneumatic tire of claim 1, wherein the diameter of at least one dimple is preferably equal to or greater than 2 mm and equal to or less than 70 mm.

5. The pneumatic tire of claim 1, wherein at least two or more dimples have different diameters and the average diameter of the dimples is equal to or greater than 4 mm.

6. The pneumatic tire of claim 1, wherein the ratio of depth to diameter of the dimples is 0.01 or greater.

7. A pneumatic tire comprising, on side surfaces thereof, a large number of dimples and a land portion separating the dimples, wherein
each dimple has a sloped surface connected to the land portion surface and a bottom surface connected to the sloped surface, wherein the bottom surface includes the entire deepest portion of the dimple, and the sloped surface of the dimple or the land portion has a small projection,
wherein
a width of the small projection on the sloped surface is smaller than a width of the sloped surface
a contour of each dimple is a circle,
the small projection is annular,
the small projection is arranged so as to be concentric with the contour of each dimple.

8. A pneumatic tire comprising, on a sidewall surface thereof, dimples and a land portion separating the dimples, wherein
the land portion surface and the sidewall surface of the tire are substantially on the same plane,
each dimple has a sloped surface connected to the land portion surface and a bottom surface connected to the sloped surface, wherein the bottom surface includes the entire deepest portion of the dimple,
each dimple includes a small projection which is formed on the sloped surface and does not touch the bottom surface, or an annular small projection which is formed on the bottom surface and does not touch the sloped surface, and
each dimple has a ratio of a long diameter to a short diameter equal to or less than 3.0,
wherein
a width of the small projection on the sloped surface is smaller than a width of the sloped surface,
the height of the small projection is equal to or greater than 0.25 mm but equal to or less than 1.0 mm, and
the width of the small projection is equal to or greater than 0.25 mm but equal to or less than 1.0 mm.

9. The pneumatic tire of claim 8, wherein the cross-sectional shape of the small projection is substantially a rectangle.

* * * * *